Figure 1:
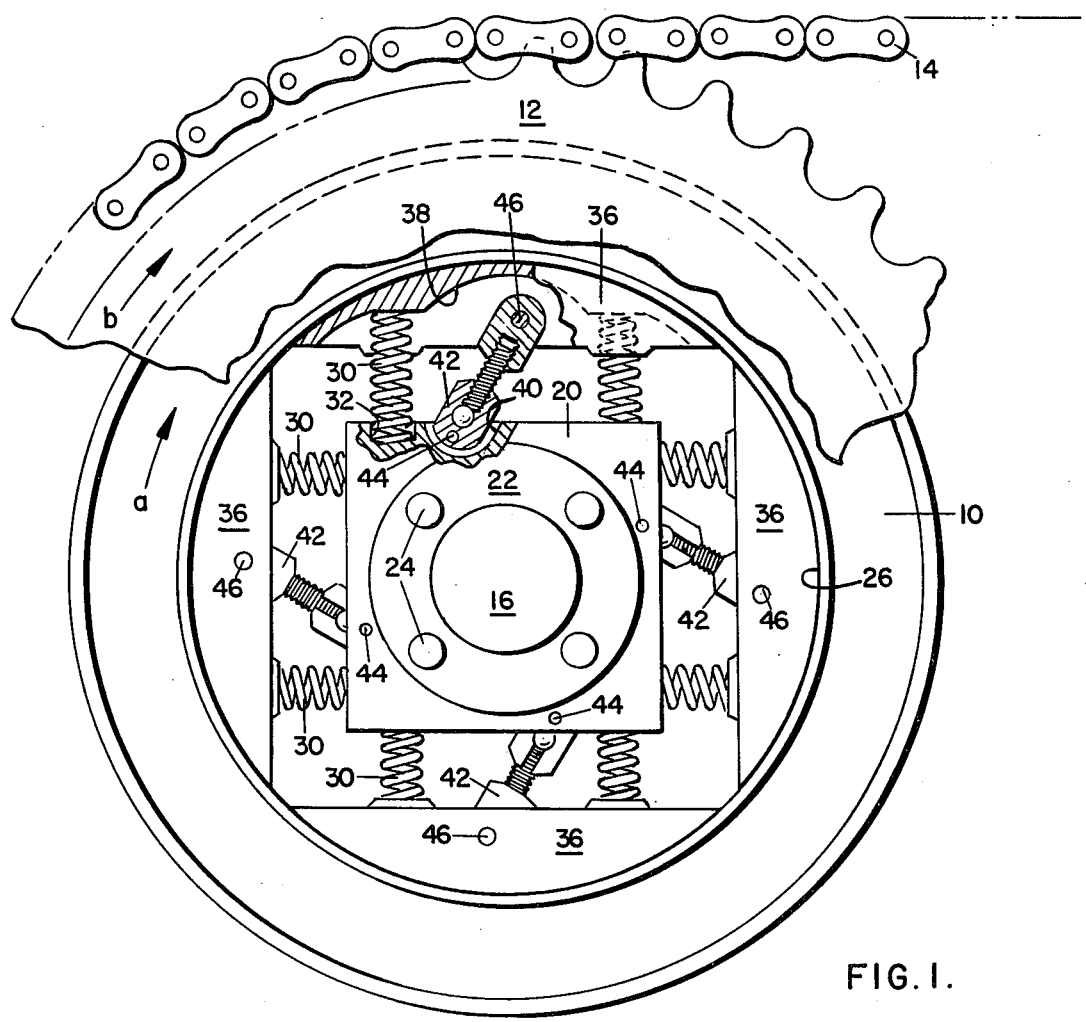

United States Patent [19]

Zeigler

[11] 3,997,016

[45] Dec. 14, 1976

[54] MOTORCYCLE SAFETY HUB

[76] Inventor: Joseph S. Zeigler, 855 John Fitch Highway, Fitchburg, Mass. 01420

[22] Filed: Apr. 16, 1975

[21] Appl. No.: 568,627

[52] U.S. Cl. .................. 180/33 B; 180/72; 280/210; 192/45.1; 301/105 B
[51] Int. Cl.² .......................................... B62D 3/00
[58] Field of Search ........... 301/9 CN, 9 SC, 9 AC, 301/9 R, 105 R, 105 B, 124 R, 126, 131, 132, 134, 135, 1; 180/33 R, 33 B, 72; 280/210, 236, 238; 192/41 A, 41 R, 45.1, 50

[56] References Cited

UNITED STATES PATENTS

| | | | |
|---|---|---|---|
| 865,666 | 9/1907 | Wendorff | 192/50 |
| 2,384,110 | 9/1945 | Malmquist | 180/33 B |

FOREIGN PATENTS OR APPLICATIONS

| | | | |
|---|---|---|---|
| 494,680 | 7/1950 | Belgium | 192/45.1 |
| 41,334 | 8/1914 | Sweden | 192/45.1 |

Primary Examiner—Robert B. Reeves
Assistant Examiner—H. Grant Skaggs
Attorney, Agent, or Firm—Ross, Ross & Flavin

[57] ABSTRACT

A mechanism which automatically disconnects a driven wheel from a drive train in the event of a mechanical failure of the drive train, allowing continued rotation of the driven wheel.

1 Claim, 2 Drawing Figures

MOTORCYCLE SAFETY HUB

This invention relates to a mechanism having a capacity for automatically changing its condition of operation from a primary operative mode, wherein a rotatable driving member is stationarily locked to a rotatable driven member, to a secondary unlocked or failure mode, wherein the driven member is unlocked from and overrides the driving member to permit rotation thereof independently of the load driven member.

It has particular application in the case of a motorcycle wherein, as known, the rear wheel is driven, via a gear train, by the engine, serving its most useful purpose in the event of a sudden, unanticipated stoppage or interruption in the normal operation of the gear train or engine when continued rear wheel rotation is the desideratum, lest the operator lose control of his machine.

This undesired stoppage or rear wheel rotation can be caused by engine overheating; a bushing or bearing locking up in the transmission; the transmission breaking and debris from a damaged gear or other component jamming the transmission; the chain jumping its sprockets or breaking.

This seizing or locking up of an engine is not common in the case of an automobile, but is a well-known and relatively frequent occurrence in the case of a motorcycle. Such seizing or locking up can and does occur, usually without warning and usually with the disastrous effect of bringing the rear wheel to an instantaneous stop, wherefore the motorcycle usually goes into a slide and crashes to the ground, and the operator is in some way injured.

There is another consideration. When one locks the drive train of an automobile, the differential is called into play and one wheel is usually allowed to turn so as to keep the vehicle under control. In the case of the motorcycle having only a single driving wheel, little or no control is possible when that wheel is suddenly stopped in its rotation.

The racing motorcyclist in particular has to recognize that this danger is omnipresent, due to extreme stressing of components. Experienced riders may often be observed with one hand poised above the clutch lever, ready to squeeze the lever and release the drive train upon sensing that the engine is about to seize.

The mechanism of this invention precludes rear wheel locking, irrespective of drive train forces that may arise to act thereon. In short, it offers a capacity for override wherein the wheel is free to rotate irrespective of the force or forces creating the seizing or locking condition.

The mechanism is only brought into play in the event that sprocket loading is suddenly stalled from whatever seized engine, locked transmission, or other situation may have suddenly and unexpectedly arisen.

The device could be readily applied to existing machines without unreasonable expense and could be easily fitted as standard equipment by a machine manufacturer.

Figure 2:
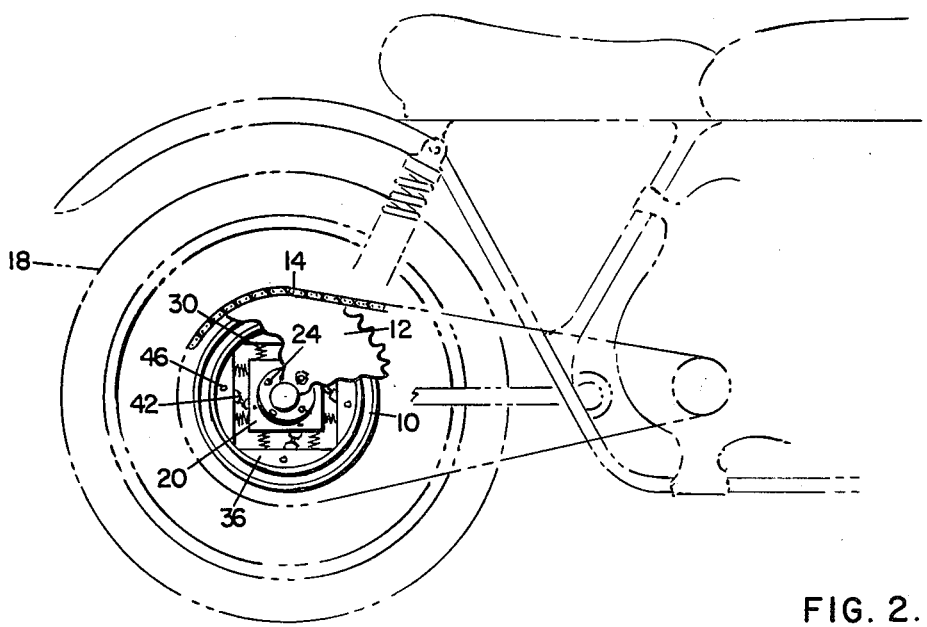

In the drawings:

FIG. 1 is a fragmentary view in side elevation, with certain portions in section, showing a preferred embodiment of the invention; and FIG. 2 is a fragmentary view of the FIG. 1 embodiment in small scale showing same as applied to the rear wheel of a motorcycle.

An outer drum 10 is journalled on the axle 16 of the rear or driving wheel 18 by such as a conventional bearing means, as is an inner housing 20 of a preferably square configuration on which is mounted a boss 22. The usual sprocket 12 is secured to the inner housing as by bolting 24. The inner housing is readily accommodated within the area defined by the inner rim 26 of outer drum 10 in manner so as to allow for the outward projection, from each inner housing side-face, of a pair of spaced spring members 30. Same are suitably seated in respective provided spring recesses 32 in each side face. The spring members of each pair unisonly support a shoe 36 having an outer surface of arcuate configuration to accommodate to, and bear against, an arcuate portion of the inner rim 26 of the outer drum 10.

Each shoe is suitably recessed from its inboard face to define a well 38, and the respective outer ends of spring members 30 seat therein, the springs serving normally to project the shoe outwardly in spaced relation from the inner housing and in bearing relation against the adjacent arcuate section of the inner rim of the outer drum. These spring members 30 provide a means for adjusting drag between the driving and driven members in the secondary or unlocked mode.

Also projecting outwardly from each side face of, and nestably received in a provided clevis pin recess 40 in, inner housing 20, is the inner housing end of a clevis pin 42 which is loosely attached by a pin 44 to the inner housing so as to allow a certain freedom of pivotal or swinging movement of the clevis pin.

A screw member is threadedly engaged in the housing end of the clevis pin so as to extend outwardly relative to the inner housing and to be threadedly engaged at its opposite free end with the stirrup of the clevis pin, which stirrup is receivable in the well 38 of the respective shoe and, by means of a pin 46, is pivotally engaged with said shoe.

The pinning of each clevis pin 42 to the inner housing and of its stirrup to its respective shoe is such as to dispose the clevis pin at an angle relative to the respective face of the inner housing and to the respective shoe so as to be inclined against torque input from the driving member.

Thus there is provided a plurality of movable load members in the form of the shoes 38, which are adapted to conjointly embrace portions of the inner drum in the primary mode as the clevis pins exhibit a tendency to force the shoes outward toward the outer drum due to their angular disposition.

However, in the event of a seizure, when the driven member is no longer being driven via the gear train and the secondary, or failure, mode is assumed, it is desired that the outer drum and wheel be free to continue rotation.

In the secondary mode, the forces tending to lock the shoes to the inner rim are overcome. These forces consist only of the pre-adjusted spring load via the spring members 30 as the clevis pins are inclined with the torque input from the driven member, i.e., the rear wheel, the clevis pins serving only as locating devices for the shoes relative to the driving member.

The device assumes the condition of pre-loaded drag in the respect that the outer drum overcomes the torque exerted by the shoes and continues to rotate.

Adjustments can be made such that the drag can be adjusted to any desired pressure even to the extent that the outer drum would be totally free of any drag in the instance of a transfer from an operative (primary) to a failure (secondary) mode. For example, the pre-loading may be adjusted such that slippage is allowed to a slight degree so as to accommodate to that situation where an operator may downshift harshly and thereby prevent that situation of a momentary stoppage or even slowing down of wheel rotation.

I claim:

1. In a mechanism for controlling torque input to a motorcycle rear wheel in the event of a mechanical failure of the motorcycle engine or drive train and having the characteristic of being automatically changeable from a primary driving mode to a secondary failure mode, the improvement in means for automatically disconnecting the rear wheel from the drive train comprising: a rotatable driving member, a rotatable driven member, means for stationarily locking the driving member to the driven member in the driving mode and adjusting for slippage when the torque exceeds the maximum engine torque for freedom of rotation of the driven member independent of the driving member and including an open outer drum fixed to the rear wheel and journalled on the rear wheel axle, an inner housing and sprocket unitary therewith with the inner housing being disposed within the opening of the outer drum, a plurality of pairs of spring means seated in and projecting outwardly from the inner housing, a plurality of arcuately configured shoes each disposed on the outer ends of the springs of a respective pair for bearing engagement with the wall of the opening of the outer drum, a plurality of pivotal clevis pins each swingably pinned to and projecting outwardly from the inner housing and swingably pinned to a respective shoe with the clevis pins normally urging the shoes outwardly toward the outer drum in the primary mode but allowing the freedom of continued rotation of the outer drum and wheel in the secondary mode when the driven member is unlocked from and overrides the driving member through the overcoming of the forces holding the shoes against the wall of the outer drum opening.

* * * * *